United States Patent
Yerger et al.

(10) Patent No.: US 11,716,334 B2
(45) Date of Patent: *Aug. 1, 2023

(54) TRANSPORT COMMUNICATION MANAGEMENT

(71) Applicant: FEDERAL EXPRESS CORPORATION, Memphis, TN (US)

(72) Inventors: Mark D. Yerger, Collierville, TN (US); Ted McFann, Arlington, TN (US); Joseph W. Slavinsky, Collierville, TN (US); Joshua Beckman Kendrick, Collierville, TN (US); Scot A. Struminger, Memphis, TN (US)

(73) Assignee: Federal Express Corporation, Memphis, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/053,501

(22) Filed: Aug. 2, 2018

(65) Prior Publication Data

US 2019/0238553 A1    Aug. 1, 2019

Related U.S. Application Data

(63) Continuation of application No. 14/315,239, filed on Jun. 25, 2014, now Pat. No. 10,069,843.
(Continued)

(51) Int. Cl.
*H04L 9/40*     (2022.01)
*H04B 7/185*    (2006.01)
(Continued)

(52) U.S. Cl.
CPC ....... *H04L 63/107* (2013.01); *H04B 7/18506* (2013.01); *H04L 63/20* (2013.01);
(Continued)

(58) Field of Classification Search
CPC . H04L 63/08; H04L 63/10–108; H04L 63/63; H04L 63/14; H04L 29/06;
(Continued)

(56) References Cited

U.S. PATENT DOCUMENTS 4,642,775 A   2/1987 Cline et al.
4,792,102 A   12/1988 Olson
(Continued)

FOREIGN PATENT DOCUMENTS

CA    2189494 A1    5/1997
CA    2533495 A1    5/2005
(Continued)

OTHER PUBLICATIONS

AEEC Letter 91-079/DLK-391 to AEEC Members dated Apr. 5, 1991, with Attachments (41 pages).
(Continued)

*Primary Examiner* — Shaqueal D Wade-Wright
(74) *Attorney, Agent, or Firm* — Ballad Spahr LLP (57) ABSTRACT

Methods and systems for communicating information are disclosed. An example method can comprise receiving information at a first device based on a first protocol. The information can be translated, at the first device, for communication to a second device based on a second protocol. A determination can be made as to whether the information matches a criterion associated with a transportation device. The information can be provided to the second device based on the second protocol and a determination that the information matches the criterion.

20 Claims, 5 Drawing Sheets

Related U.S. Application Data (60) Provisional application No. 61/839,090, filed on Jun. 25, 2013.

(51) Int. Cl.
*H04L 67/12* (2022.01)
*H04L 69/08* (2022.01)

(52) U.S. Cl.
CPC .............. *H04L 67/12* (2013.01); *H04L 69/08* (2013.01); *H04L 63/08* (2013.01)

(58) Field of Classification Search
CPC ................. H04L 29/32; G06F 21/6218; G06F 21/70–88; H04W 80/04; H04W 36/18
See application file for complete search history.

(56) References Cited

U.S. PATENT DOCUMENTS

| | | | |
|---|---|---|---|
| 5,359,446 | A | 10/1994 | Johnson et al. |
| 5,445,347 | A | 8/1995 | Ng |
| 5,557,522 | A | 9/1996 | Nakayama et al. |
| 5,809,396 | A | 9/1998 | Armbruster |
| 5,832,408 | A | 11/1998 | Tamai et al. |
| 6,047,165 | A | 4/2000 | Wright et al. |
| 6,104,914 | A | 8/2000 | Wright et al. |
| 6,108,523 | A | 8/2000 | Wright et al. |
| 6,148,179 | A | 11/2000 | Wright et al. |
| 6,154,636 | A | 11/2000 | Wright et al. |
| 6,154,637 | A | 11/2000 | Wright et al. |
| 6,160,998 | A | 12/2000 | Wright et al. |
| 6,163,681 | A | 12/2000 | Wright et al. |
| 6,167,238 | A | 12/2000 | Wright |
| 6,167,239 | A | 12/2000 | Wright et al. |
| 6,173,159 | B1 | 1/2001 | Wright et al. |
| 6,308,044 | B1 | 10/2001 | Wright et al. |
| 6,308,045 | B1 | 10/2001 | Wright et al. |
| 6,353,734 | B1 | 3/2002 | Wright et al. |
| 6,522,867 | B1 | 2/2003 | Wright et al. |
| 6,745,010 | B2 | 6/2004 | Wright et al. |
| 6,760,778 | B1 * | 7/2004 | Nelson ............... H04B 7/18506 455/431 |
| 6,775,545 | B2 | 8/2004 | Wright et al. |
| 6,889,137 | B1 | 5/2005 | Rychlak |
| 6,943,699 | B2 | 9/2005 | Ziarno |
| 6,944,533 | B2 | 9/2005 | Kozak et al. |
| 6,990,319 | B2 | 1/2006 | Wright et al. |
| 7,149,530 | B1 | 12/2006 | Arakawa et al. |
| RE40,479 | E | 9/2008 | Wright et al. |
| 7,426,387 | B2 | 9/2008 | Wright et al. |
| 7,426,388 | B1 | 9/2008 | Wright et al. |
| 7,428,412 | B2 | 9/2008 | Wright et al. |
| 7,444,146 | B1 | 10/2008 | Wright et al. |
| 7,456,756 | B2 | 11/2008 | Ziarno |
| 7,546,123 | B2 | 6/2009 | Wright et al. |
| 7,584,179 | B2 | 9/2009 | Finley et al. |
| 7,620,374 | B2 | 11/2009 | Ziarno et al. |
| 7,769,376 | B2 | 8/2010 | Wright et al. |
| 8,165,793 | B1 | 4/2012 | Pylant |
| 8,220,038 | B1 | 7/2012 | Lucchesi et al. |
| 8,290,696 | B1 | 10/2012 | Sridhar et al. |
| 8,351,926 | B1 | 1/2013 | Wright et al. |
| 8,351,927 | B2 | 1/2013 | Wright et al. |
| 9,015,152 | B1 | 4/2015 | Schogol |
| 2002/0018008 | A1 | 2/2002 | Wright et al. |
| 2002/0147733 | A1 | 10/2002 | Gold et al. |
| 2005/0222761 | A1 | 10/2005 | Uyeki et al. |
| 2006/0020373 | A1 | 1/2006 | Abe |
| 2006/0047715 | A1 | 3/2006 | Parizeau |
| 2006/0057974 | A1 | 3/2006 | Ziarno et al. |
| 2006/0080451 | A1 | 4/2006 | Eckert |
| 2007/0050108 | A1 | 3/2007 | Larschan et al. |
| 2007/0088467 | A1 | 4/2007 | H. Knotts |
| 2007/0115938 | A1 * | 5/2007 | Conzachi ............. B64F 5/60 370/352 |
| 2007/0118279 | A1 | 5/2007 | Kudo |
| 2007/0298739 | A1 | 12/2007 | Rao et al. |
| 2008/0005275 | A1 | 1/2008 | Overton et al. |
| 2008/0072049 | A1 * | 3/2008 | Cross ...................... G06F 21/51 713/176 |
| 2008/0075912 | A1 | 3/2008 | Malinek |
| 2008/0117757 | A1 | 5/2008 | Kim |
| 2009/0109063 | A1 | 4/2009 | Grimshaw et al. |
| 2009/0138517 | A1 * | 5/2009 | McLain ................. G06F 16/93 |
| 2009/0140887 | A1 | 6/2009 | Breed et al. |
| 2009/0248959 | A1 | 10/2009 | Tzeng |
| 2009/0299566 | A1 | 12/2009 | Tanigawa et al. |
| 2009/0312946 | A1 | 12/2009 | Yoshioka et al. |
| 2010/0318794 | A1 * | 12/2010 | Dierickx ............. H04L 63/0861 713/164 |
| 2011/0021149 | A1 | 1/2011 | Goto et al. |
| 2011/0144897 | A1 | 6/2011 | Dunsky |
| 2011/0255506 | A1 * | 10/2011 | Toth ................... H04B 7/18506 370/331 |
| 2012/0022782 | A1 | 1/2012 | Laube et al. |
| 2012/0259722 | A1 | 10/2012 | Mikurak |
| 2012/0272231 | A1 | 10/2012 | Kwon et al. |
| 2012/0303826 | A1 | 11/2012 | Nelson et al. |
| 2013/0036103 | A1 * | 2/2013 | Lawson .................. G06F 21/64 707/698 |
| 2013/0104186 | A1 * | 4/2013 | Dietz .................. H04W 12/088 726/1 |
| 2013/0247015 | A1 * | 9/2013 | Abadi ...................... G06F 8/75 717/132 |
| 2014/0136589 | A1 * | 5/2014 | Wahler .............. H04L 29/08144 709/201 |
| 2014/0325518 | A1 | 10/2014 | Kim |
| 2015/0032979 | A1 | 1/2015 | Li et al. |
| 2016/0086392 | A1 | 3/2016 | Ziarno |
| 2017/0193026 | A1 | 7/2017 | Pettovello |
| 2019/0102161 | A1 * | 4/2019 | Short ..................... G06Q 10/00 |

FOREIGN PATENT DOCUMENTS

| | | |
|---|---|---|
| CN | 1846238 A | 10/2006 |
| EP | 0407179 A1 | 1/1991 |
| EP | 0743580 A1 | 11/1996 |
| EP | 0774724 A2 | 5/1997 |
| EP | 1654715 A2 | 5/2006 |
| EP | 2053480 A2 | 4/2009 |
| JP | 2007516377 A | 6/2007 |
| KR | 20060052868 A | 5/2006 |
| WO | WO-2007/013878 A2 | 2/2007 |

OTHER PUBLICATIONS

ARINC Letter to ELS/TG-115 Subcommittee, Avionics Pub. No. 93-203/ELS-74, Sep. 1, 1993 (174 pages).

ARINC Letter to FCM/TG-111, Avionics Pub. No. 94-205/FCM-69, Sep. 1, 1994 (38 pages).

ARINC, "Design Guidance for Onboard Maintenance System" ARINC Characteristic 624-1. published Aug. 30, 1993 (102 pages).

ARINC, "Gate-Aircraft Terminal Environment Link (Gatelink)—Aircraft Side," Characteristic 751, published Jan. 1, 1994 (31 pages).

ARINC, "Gate-Aircraft Terminal Environment Link (Gatelink)—Ground Link," ARINC Specification 632, published Dec. 30, 1994 (30 pages).

ARINC, "Quick Access Recorder for AIDS System (QAR)" ARINC Characteristic 591, published Jul. 26, 1972 (21 pages).

Aviation Week & Space Technology "Conversion Approach Appears Flawed", Jul. 26, 1993, (3 pages).

Aviation Week & Space Technology "Safety Board Urges Mandatory Use of FDR/CVRs in Commuter Transports", Aug. 31, 1987, (5 pages).

Beckman, "L-1011 Flight Data Recording Systems-Background, Features, Implications and Benefits," AIAA Aircraft Systems and Technology Conference, 1978 (9 pages).

Electronic Engineering Times "Module Is Result of Work With Apple—Plessey Makes Leap With Wireless LAN", Nov. 7, 1994, (3 pages).

(56) References Cited

OTHER PUBLICATIONS

Office Action dated Jul. 28, 2017 by the Canadian Intellectual Property Office for Patent Application No. 2,915,988, which was filed on Jun. 25, 2014 (Inventor—Yerger et al.; Applicant—FedEx Corporation) (5 pages).
Notice of Allowance dated Jul. 17, 2018 by the Canadian Intellectual Property Office for Patent Application No. 2,915,988, which was filed on Jun. 25, 2014 (Inventor—Yerger et al.; Applicant—FedEx Corporation) (5 pages).
Supplementary European Search Report dated Oct. 28, 2016 by the European Patent Office for EP Application No. 14817624.1, which was filed on Jun. 25, 2014 and published as 3014853 on May 4, 2016 (Applicant—FedEx Corporation) (10 Pages).
International Search Report dated Oct. 14, 2014 for International Patent Application No. PCT/US2014/044177, filed on Jun. 25, 2014 and published as WO 2014/210215 on Dec. 31, 2014 (Inventor—Yerger; Applicant—FedEx Corporation) (pp. 1-2).
Non-Final Office Action dated Oct. 21, 2015 by the U.S. Patent and Trademark Office for U.S. Appl. No. 14/315,239, filed Jun. 25, 2014 and issued as U.S. Pat. No. 10,069,843 on Sep. 4, 2018 (Inventor—Yerger et al.; Applicant—FedEx Corp.) (12 pages).
Final Office Action dated Jun. 17, 2016 by the U.S. Patent and Trademark Office for U.S. Appl. No. 14/315,239, filed Jun. 25, 2014 and issued as U.S. Pat. No. 10,069,843 on Sep. 4, 2018 (Inventor—Yerger et al.; Applicant—FedEx Corp.) (21 pages).
Non-Final Office Action dated Feb. 9, 2017 by the U.S. Patent and Trademark Office for U.S. Appl. No. 14/315,239, filed Jun. 25, 2014 and issued as U.S. Pat. No. 10,069,843 on Sep. 4, 2018 (Inventor—Yerger et al.; Applicant—FedEx Corp.) (15 pages).
Final Office Action idated Jul. 13, 2017 by the U.S. Patent and Trademark Office for U.S. Appl. No. 14/315,239, filed Jun. 25, 2014 and issued as U.S. Pat. No. 10,069,843 on Sep. 4, 2018 (Inventor—Yerger et al.; Applicant—FedEx Corp.) (14 pages).
Notice of Allowance dated May 2, 2018 by the U.S. Patent and Trademark Office for U.S. Appl. No. 14/315,239, filed Jun. 25, 2014 and issued as U.S. Pat. No. 10,069,843 on Sep. 4, 2018 (Inventor—Yerger et al.; Applicant—FedEx Corp.) (13 pages).
International Search Report and Written Opinion dated Apr. 30, 2015 for appliction PCT/US2014/071245, filed on Dec. 18, 2014, and published as WO 2015/095575 on Jun. 25, 2015 (Fed Ex Corporation // Inventor—Sosa, et al.) (15 pages).
International Preliminary Report on Patentability dated Jun. 21, 2016 for application PCT/US2014/071245, filed on Dec. 18, 2014, and published as WO 2015/095575 on Jun. 25, 2015 (Fed Ex Corporation // Inventor—Sosa et al.) (7 pages).
Non-Final Office Action dated Mar. 23, 2017 by the U.S. Patent and Trademark Office for U.S. Appl. No. 14/575,654, which was filed on Dec. 18, 2014 and published as U.S. 2015/0169662 on Jun. 18, 2015 (Inventor—Hills et al.; Applicant—FedEx Corporation) (15 pages).
Response to Non-Final Office Action filed on Aug. 23, 2017 with the U.S. Patent and Trademark Office for U.S. Appl. No. 14/575,654, filed Dec. 18, 2014 and published as U.S. 2015/0169662 on Jun. 18, 2015 (Inventor—Hills et al.; Applicant—FedEx Corporation) (14 pages).
Final Office Action dated Oct. 18, 2017 by the U.S. Patent and Trademark Office for U.S. Appl. No. 14/575,654, filed Dec. 18, 2014 and published as U.S. 2015/0169662 on Jun. 18, 2015 (Inventor—Hills et al.; Applicant—FedEx Corporation) (21 pages).
Response to Final Office Action and Request for Continued Examination filed on Feb. 20, 2018 with the U.S. Patent and Trademark Office for U.S. Appl. No. 14/575,654, filed Dec. 18, 2014 and published as U.S. 2015/0169662 on Jun. 18, 2015 (Inventor—Hills et al.; Applicant—FedEx Corporation) (18 pages).
Non-Final Office Action dated May 24, 2018 by the U.S. Patent and Trademark Office for U.S. Appl. No. 14/575,654, filed Dec. 18, 2014 and published as U.S. 2015/0169662 on Jun. 18, 2015 (Inventor—Hills et al.; Applicant—FedEx Corp.) (13 pages).
Final Office Action dated Jan. 8, 2019 by the U.S. Patent and Trademark Office for U.S. Appl. No. 14/575,654, filed Dec. 18, 2014 and published as U.S. 2015/0169662 on Jun. 18, 2015 (Inventor—Hills et al.; Applicant—FedEx Corp.) (15 pages).
Response to Final Rejection and RCE dated Jul. 8, 2019 to the USPTO for U.S. Appl. No. 14/575,654, filed Dec. 18, 2014 and published as U.S. 2015/0169662 on Jun. 18, 2015 (Inventor—Larry Hills) (14 pages).
Non Final Rejection dated Aug. 1, 2019 by the USPTO for U.S. Appl. No. 14/575,654, filed Dec. 18, 2014 and published as U.S. 2015-0169662 A1 on (Inventor—Larry Hills) (14 Pages).
Non Final Rejection dated Jan. 22, 2020 by the USPTO for U.S. Appl. No. 14/575,654, filed Dec. 18, 2014 and published as U.S. 2015-0169662 A1 on Jun. 18, 2015 (Inventor—Larry Hills) (18 Pages).
Response to Non-Final Office Action filed on Jul. 21, 2020 with the U.S. Patent and Trademark Office for U.S. Appl. No. 14/575,654, filed Dec. 18, 2014, and published as U.S. 2015/0169662 on Jun. 18, 2015 (Inventor—Hills et al.; Applicant—FedEx Corporation) (16 pages).
Notice of Allowance dated Aug. 21, 2020 by the U.S. Patent and Trademark Office for U.S. Appl. No. 14/575,654, filed Dec. 18, 2014, and published as U.S. 2015/0169662 on Jun. 18, 2015 (Inventor—Hills et al.; Applicant—FedEx Corporation) (10 pages).
U.S. Appl. No. 17/100,414, filed Nov. 20, 2020, now U.S. 2021/0286796, Sep. 16, 2021, Inventor Larry Hills (Federal Express Corporation).

* cited by examiner

TRANSPORT COMMUNICATION MANAGEMENT

CROSS REFERENCE TO RELATED PATENT APPLICATION

This application is a continuation of U.S. Non-Provisional application Ser. No. 14/315,239 filed Jun. 25, 2014, which claims priority to U.S. Provisional Application No. 61/839,090 filed Jun. 25, 2013, which are herein incorporated by reference in their entireties.

SUMMARY

It is to be understood that both the following general description and the following detailed description are exemplary and explanatory only and are not restrictive, as claimed. Provided are methods and systems for communicating information. An example method can comprise receiving information at a first device based on a first protocol. The information can be translated, at the first device, for communication to a second device based on a second protocol. A determination can be made as to whether the information matches a criterion associated with a transportation device. The information can be provided to the second device based on the second protocol and a determination that the information matches the criterion.

In another aspect, an example method can comprise receiving information at a transportation device. The information can be provided to a first network of the transportation device based on a first protocol. The information can be analyzed, at a component of the first network, based on at least one of a security rule and an update rule. The information can be provided to a system element of the transportation device based on the analyzing of the information.

In another aspect, an example device (e.g., transportation device) can comprise a system element configured to assist in navigation, a first network configured to communicate based on a first protocol, and a second network configured to communicate based on a second protocol. The second network can be communicatively coupled to the system element. The example device can comprise a communication management device communicatively coupled to the first network and the second network. The communication management device can be configured to translate information between the first network and the second network based on at least one of a security rule and an update rule.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium.

More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In an aspect, the present disclosure relates to communication with a mobile network. In an aspect, the mobile network can be internal to a vehicle, such as an aircraft, train, automobile, boat, and the like. In an aspect, the mobile network can send and receive information according to a variety of communication methods. For example, the communication methods can comprise one or more of satellite, cellular, infrared, ACARS, short message service (SMS), 802.x, fiber optic, microwave, radio frequency, high frequency radio wave (e.g., 3-30 MHz), very high frequency radio wave (e.g., 30-300 MHz), ultra high frequency radio wave (e.g., 300 MHz-3 GHz), other regulated and unregulated radio frequency spectra used to convey signals, copper wire, and the like. In an aspect, the communication methods each adhere to one or more specific communication protocols and/or standards and, as such, use specialized transceivers to send/receive information between the mobile network and any system desirous of communicating with the mobile network. In an aspect, the mobile network can comprise one or more Communications Traffic Management Unit (CTMU). The CTMU can be configured for receiving information according to one or more of the communication methods and for translating the received information for further communication within the mobile network according to a common protocol. For example, the common protocol can comprise an internet protocol (IP), transmission control protocol (TCP), Aeronautical Radio Incorporated (ARINC) standard radio transmission protocols, time division multiple access (TDMA) based protocols, code division multiple access (CDMA) based protocols, a combination thereof (e.g., TCP/IP), and the like. Similarly, the CTMU can be configured for transmitting information from the mobile network according to one or more of the communication methods. In an aspect, the CTMU can receive information from the mobile network according to a common protocol and can translate the received information for transmission according to one or more of the communication methods.

In an aspect, the present disclosure further relates to communications within the mobile network. The mobile network can comprise one or more devices configured to perform a variety of functions and/or to provide a variety of services. The devices can include, for example, sensors, communication devices, computing devices, avionics equipment, vehicle components (e.g., engines, ventilation systems, etc. . . . ), and the like. In an aspect, the functions and/or services can relate to the operation of the vehicle. The functions and/or services can exchange information with devices both inside and outside the vehicle. For example, the devices can comprise a flight data acquisition unit (FDAU), aircraft condition monitoring system (ACMS), enhanced ground proximity warning system (EGPWS), traffic collision avoidance system (TCAS), terrain awareness and warning system (TAWS), automatic dependent surveillance-broadcast (ADS-B) device, flight management system (FMS), aircraft communication addressing and reporting system (ACARS), electronic flight bag (EFB), onboard navigation system (ONS), primary flight display (PFD), navigation displays, any device connected to an aircraft data bus (e.g., ARINC based device, MIL-STD-1553 based device), data loader devices, and the like.

In an aspect, devices internal to the mobile network (internal devices) can be updated through software updates or other reconfiguration information. Computing devices external (external devices) to the mobile network can be used to provide software updates, reconfiguration information, operational information, and other information to the mobile network.

The external devices and the internal devices can communicate through a variety of protocols and standards. Accordingly, the CTMU can be configured to provide communication and operability amongst the internal devices and between the internal devices and external devices. The CTMU can enable internal device updates, information exchange, and other communication, while at the same time protecting the internal devices from unauthorized communication. Those skilled in the art will appreciate that present methods may be used in systems that employ both digital and analog equipment. One skilled in the art will appreciate that provided herein is a functional description and that the respective functions can be performed by software, hardware, or a combination of software and hardware.

Figure 1:
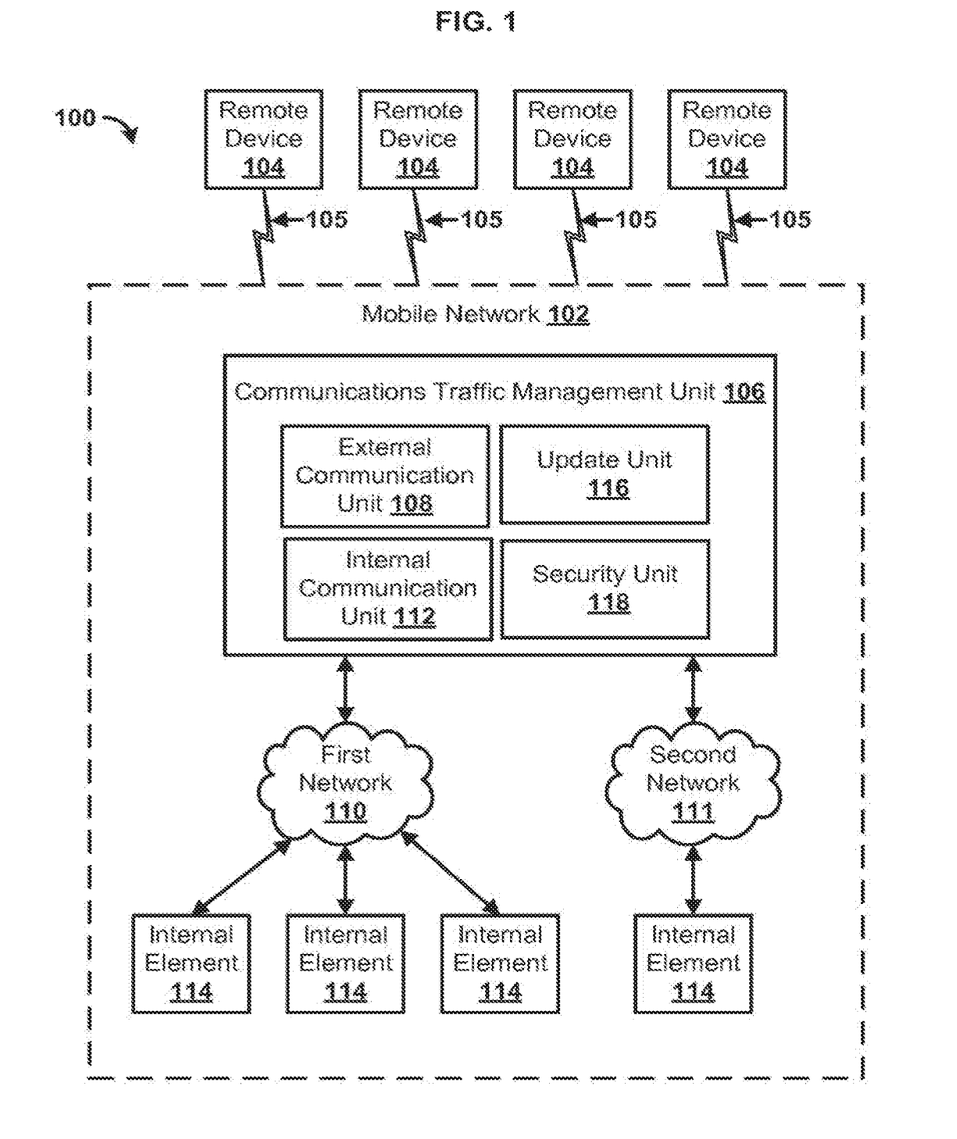
FIG. 1 is a block diagram illustrating various aspects of an exemplary system in which the present methods and systems can operate.

FIG. 1 is a block diagram illustrating various aspects of an exemplary system 100 in which the present methods and systems can operate. In one aspect, the system 100 can comprise a mobile network 102. The mobile network 102 can be contained within a vehicle configured to transport (e.g., carry, convey, travel) people and/or items to and from a variety of locations. For example, the vehicle can comprise an airborne vehicle (e.g., airplane, helicopter, blimp), terrestrial vehicle (e.g., car, truck, motorcycle), space vehicle (e.g., satellite, space shuttle, rocket), and/or watercraft vehicle (e.g., boat, ship, submarine, hovercraft). The vehicle can be a manned or unmanned vehicle.

In one aspect, the system 100 can comprise one or more remote devices 104. For example, the remote devices 104 can comprise remote servers, monitoring devices (e.g., weather station), portable computing devices (e.g., tablet device, laptop device), smart devices (e.g., smart phones, smart watch, smart accessory), and the like. The remote devices 104 can be configured to communicate to the mobile network 102 through a variety of communication links 105. The communication links 105 can comprise wireless communication links (e.g., radio frequency, satellite, microwave, high frequency radio wave, very high frequency radio wave, ultra high frequency radio wave, and other regulated and unregulated radio frequency spectra used to convey signals) and/or physical communication links (e.g., fiber optic cable, coaxial cable, Ethernet cable, copper wire).

In an aspect, one or more of the remote devices 104 can provide information for updating and/or configuring one or more systems (e.g., devices, elements, and/or components) in the mobile network 102, information for display on one or more systems in the mobile network 102, information for processing by one or more systems in the mobile network 102, combinations thereof, and the like. For example, the remote devices 104 can provide software and/or firmware updates for one or more systems of the mobile network 102. As a further example, the remote devices 104 can provide transport information to one or more systems of the mobile network 102. For example, transport information can comprise weather information, fuel information, location information (e.g., speed, direction, altitude, geographic positioning system data), traffic information, route information (e.g., updates to travel route), entertainment information (e.g., audio data, movie data, streaming content), regulatory information (e.g., customs, TSA, FAA), cargo information (e.g., cargo temperature, cargo pressure, or other environmental information), status information (e.g., aircraft or component performance or fault reporting information), combinations thereof, and the like. Transport information can comprise vehicle component health information (e.g., BITE (Built-in Test Equipment) status), real-time component data (e.g., speed, altitude, direction, position, other system data), maintenance information, vehicle log book entries, safety information, handshake information, emergency information, video feed of life-science cargo, and/or the like.

In one aspect, the mobile network 102 can comprise a communications traffic management unit (CTMU) 106. The CTMU 106 can be configured to manage external communications to and from the mobile network 102. The CTMU 106 can also be configured to manage internal communications among elements of the mobile network 102. As an illustration, a CTMU 106 in an aircraft can manage communication between the aircraft, the aircraft's component parts, and the rest of the airline/regulatory system while the aircraft is in the air and on the ground. The CTMU 106 can determine priority of communication, availability of communications links, cost of said links, and the like. For example, priority of communication can be determined based one or more priority rules (e.g., cost priority) specified by a user. The priority rules can be based on the value of the data to a user or the user's customer, the size of the data package to be transmitted, the mobile network's 102 location, phase of travel (e.g., phase of flight), the real-time cost (e.g., cost at a given location or phase of travel) of the transmission links that the mobile network 202 is configured to use (e.g., Wi-Fi, Cellular, Satellite, ACARS, Bluetooth, NFC), and the like. The CTMU 106 can also manage communication traffic across the appropriate network without airborne or ground crew intervention. Additionally, the CTMU 106 can facilitate the use of legacy components and existing FAA (Federal Aviation Administration) approved input/output channels that are currently certified on avionics components on the aircraft. For example, the CTMU 106 can be configured to translate between information according to protocols of legacy components and existing FAA approved input/output channels and information according to other updated protocols, protocols used outside the context of avionics, common network protocols, and/or the like.

In one aspect, the CTMU 106 can comprise an external communication unit 108. The external communication unit 108 can be configured to transmit and receive communication to and from the remote devices 104. For example, the external communication unit 108 can be coupled to one or more transceivers. The external communication unit 108 can be configured to receive wireless and/or hardline communications through a variety of communications standards and protocols, such as IEEE 802.x, 3G, 4G, HF, VHF, and the like. As an illustration, the CTMU 106 can facilitate upload/download of information between the remote devices 104 and the mobile network 102 in all phases of travel (e.g., parked, loading, take off, flight, landing, etc. . . . ) for all types of transmission (e.g., software LRU updates, datalink communications, vehicle performance data, and the like).

In one aspect, the external communication unit 108 can be configured to select a particular communication link 105 for communication based on one or more factors, conditions, and/or the like. For example, the external communication unit 108 can select the particular communication link 105 based on the cost of transmitting information using the particular communication link 105. The selection process can be illustrated as follows. A certain amount of data (e.g., 10 kilobytes of low-priority data, such as for replenishment of routine service items) can be scheduled for transmission from the mobile network 102 to a ground station. A mobile network 102 may have the capability of transmitting data via an ACARS VHF communication link, a public WiFi communication link, or a ground cellular communications link. Based on cost rules (e.g., the public WiFi is free, ACARS costs $2/kilobyte, Cellular costs $1/Megabyte), and the urgency of the data, the CTMU 106 can decide whether to transmit the data or to hold the data until the external communication unit 108 detects a communication option at a lesser cost (e.g., WiFi hot spot or other communication option at an arrival gate). If no such option exists within a pre-determined time window, the CTMU 106 can then attempt to select another communication option (e.g., ground cellular path) as the next best cost option. Other, more expensive communication options (such as, ACARS) can be avoided or, as an alternative, reserved until the information becomes time critical.

As another example, the external communication unit 108 can select the particular communication link 105 based on the location of the mobile network 102. As an example, a mobile network 102 can be configured to communicate on the ground using Wi-Fi or cellular, and during travel (e.g., in the air) using cellular or satellite, such as Air to Ground (ATG) cellular or satellite. If the desire is to transmit a customer's critical package information (e.g., 1 Megabyte of temperature and humidity data at a certain frequency) while in the transit, the external communication unit 108 can determine the mobile network 102 position (e.g., Domestic US) and verify that both cellular and satellite communication links are available. Based on cost rules (e.g., ATG Cellular $3/Megabyte versus Satellite $7/Megabyte), the external communication unit 108 can select the communication link 105 configured for cellular communication and send the information based on a first time window (e.g., every 15 minutes). If cellular communication is not available, the external communication unit 108 can select the communication link 105 for satellite communication and send the information based on a second time window (e.g., every 30 minutes). If the aircraft is flying internationally, the external communication unit 108 can select the communication link 105 configured for satellite communication, and transmit the data every hour (e.g., since satellite may be the only means of transmitting the data over large bodies of water). The intent of the analysis is to provide an optimum cost (e.g., lowest cost for available given certain constraints) throughout the duration of travel (e.g., flight) regardless of the communication link 105 used. As a further example, the external communication unit 108 can select the particular communication link 105 based on the availability of the particular communication link 105.

In one aspect, the mobile network 102 can comprise a first network 110. In another aspect, the mobile network 102 can comprise a second network 111. The first network 110 and/or second network 111 can receive information from the CTMU 106 and provide the information to a variety of elements (e.g., software modules, hardware devices) within the mobile network 102. The first network 110 and/or second network 111 can comprise network adapters, switches, routers, and the like connected through wireless links (e.g., radio frequency, satellite) and/or physical links (e.g., fiber optic cable, coaxial cable, Ethernet cable). In one aspect, the first network 110 can communicate based on a first communication protocol. In another aspect, the second network 111 can communicate based on a second communication protocol. In an aspect, the first communication protocol can be the same as the second communication protocol. For example, the first network 110 and/or the second network 111 can communicate using a protocol specific to the vehicle. In an aspect, the first communication protocol and/or second communication protocol can comprise one or more of internet protocol, transmission control protocol (TCP), internet control message protocol (ICMP), user datagram protocol (UDP), Aircraft Communications and Reporting System (ACARS) protocol, ARINC protocols, or other similar protocol.

In one aspect, the CTMU 106 can comprise an internal communication unit 112. The internal communication unit 112 can be configured to receive information from and/or provide communications to the first network 110 and the second network 111. The internal communication unit 112 can be communicatively coupled to one or more internal elements 114 of the vehicle through the first network 110 and/or second network 111. In one aspect, the internal communication unit 112 can translate a communication received on the first network 110 to a communication received on the second network 111. Similarly, the internal communication unit 112 can translate a communication received on the second network 111 to a communication on the first network 110. The internal elements 114 can comprise devices and/or software modules internal to (e.g., located in, attached to) the vehicle. For example, the internal elements 114 can comprise a line replaceable unit, a travel control system (e.g., flight management system), vehicle monitoring system (e.g., aircraft condition monitoring system), travel information management device (e.g., electronic flight bag), and the like.

In one aspect, the CTMU 106 can comprise an update unit 116 configured to retrieve and/or receive updates, such as software updates, for internal elements 114 of the mobile network 102. The update unit 116 can be configured to provide the updates to the internal elements 114 of the mobile network 102. The update unit 116 can be configured to provide updates according to one or more update rules. For example, the update rules can specify conditions for updating the internal elements 114. The update rules can specify times, locations, system status, type of update, remote device 104 providing the update, and/or other similar conditions. For example, the update unit 116 can provide updates to some internal elements 114 while the mobile network is traveling and to other internal elements 114 while the mobile network is located at a base, port, or other station. As an example, the update unit 116 can be configured to update a travel control system (e.g., an internal element 114 which is critical to safety of operation, such as flight) based on or more conditions, such as an operation status (e.g., in flight, not in flight) of the mobile network 102, authentication status of the external device requesting the update, and user (e.g., maintenance technician) status (e.g., onboard the vehicle of the mobile network 102 ready to accept the update). As a further example, for a less-critical element, such as an internal element 114 configured for vehicle monitoring, the update unit 116 can update the internal element 114 during any phase of travel (e.g., flight) as long as the remote device 104 has been authenticated.

In one aspect, the update unit 116 can provide an update to an internal element 114 and/or perform an update on an internal element 114. The update unit 116 can be configured to run one or more diagnostic tests on the updates. The diagnostic test can be performed at the update unit 116 or at the internal element 114 receiving the update. For example, a diagnostic test can verify program functionality, data veracity, and/or the like of one or more of the internal elements 114. In one aspect, the update unit 116 can provide a notification indicating the update status (e.g., complete, failure). For example, the update unit 116 can provide the notification to a remote device 104, such as a device that requested and/or provided the update to the CTMU 106.

In one aspect, the update unit 116 can be configured to manage complete and partial updates received by the mobile network 102. For example, the update unit 116 can receive transmissions of complete and/or partial updates (e.g., a set of data fragments associated with an update file). The CTMU 106 can accept and manage partial updates or other communications based on a variety of factors, such as signal interruption, phase of operation, loss, acquisition, cost of an additional communication mode, prioritization of the various packets of information in queue, and the like. As an illustration, a partial update can occur via coaxial cable connection while the mobile network 102 is at a specific location, such as a gate, hangar, garage, port, and the like. At departure time, the coaxial cable can be disconnected before the full update is received by the mobile network 202. After beginning travel, the mobile network 102 can enter travel space (e.g., airspace, zone, channel) where sufficient bandwidth (e.g., VHF bandwidth) is available to resume the upload process. The CTMU 106 can validate the data fragments of the partial update. The CTM U 106 can assemble the data packets as the packets are received. The CTMU 106 can validate to internal devices (e.g., security unit 118, internal elements 114) and/or external devices (e.g., remote devices 104) that the update is complete, error free, and/or free of introduced risks such as viruses, Trojans, or other malicious content.

In one aspect, validation of updates can be based on a variety of factors, such as the type of update and how the CTMU 106 is programmed to receive updates. For instance, the first transmission of an update may contain a number of parts that will be transmitted along with checksum values for the total transmission and/or for each part of the transmission. The CTMU 106 and/or the remote device 104 sending the update can keep track of the start and stop of transmission of each part of the update. If a communication link 105 is disconnected and reestablished, the CTMU 106 and remote device 104 can be configured to verify that CTMU 106 and the remote device 104 are synchronized before continuing transmission of the update. Upon completion of transmission of each part of the update and the completion of the entire update, a total checksum can be transmitted from the remote device 104 and used for verification by the CTMU 106. Once the transmission is fully uploaded, CTMU 106 can be configured to validate (e.g., based on virus software or the like) that there are no risks to update an internal element 114. The CTMU 106 can store all or part of the updates and/or other content until such time as the information may be safely transmitted or otherwise acted upon (e.g., installed on an internal element 114). For example, the CTMU 106 can be configured to perform a periodic (e.g., a daily, bi-weekly, weekly, monthly) update to an internal element 114 in accordance with a defined schedule.

In one aspect, the CTMU 106 can comprise a security unit 118 configured to prevent (e.g., block) unauthorized communication to one or more of the internal elements 114. The security unit 118 can be configured to block communication according to one or more security rules. For example, The security rules can instruct the security unit 118 to allow or block communication according to the type of communication, time of communication, substance of the communication, intended recipient of communication, source (e.g., by user, software, and/or device) of communication, and the like. For example, certain communications can be blocked while the mobile network 102 is moving, is in a certain geographic location, above a specified altitude, has a specified system status (e.g., low fuel, engine failure), and the like. Further methods to manage security can comprise certificate management, specific hardware address or identification protocols (e.g., MAC address) or other similar embodiments.

The security unit 118 can be configured to address and prevent errors, malicious content, and/or unintended disclosure of secure information in some or all phases of operation. The security unit 118 can be configured to verify the identity of remote devices 104 and internal elements 114, whether operated by the owner of the mobile network 102, a service provider, an equipment manufacturer, a regulatory entity, a crewmember, or other entity or person connected to the mobile network 102. For example, the security unit 118 can be configured to perform data packet management and validation. As an illustration, the security unit 118 can be configured to manage and validate passwords, encryption, bit-checking, cyclic redundancy checks, self-testing and reporting mechanisms (e.g., aviation example would be a successful "return to service" self-test of an EGPWS computer).

In one aspect, the security unit 118 can prevent communication from one of the first network 110 and second network 111 to the other of the first network 110 and second network 111. For example, the internal elements 114 on the first network 110 can comprise system elements critical to vehicle operation, such as flight control systems, engine management systems, and the like. The internal elements 114 on the second network 111 can comprise, for example, system elements that are not critical to vehicle operation, such as entertainment systems, passenger devices, and the like. Some of the passengers may not be authorized to provide communication to the system elements. Accordingly, the security unit 118 can prevent communication from the system elements on the second network 111 to the system elements on the first network 110. For example, the security unit 118 can prevent communication from the system elements on the second network 111 that are not critical to vehicle operation to system elements on the first network 110 that are critical to system operation.

In another aspect, the security unit 118 can prevent unauthorized communication from a remote device 104 to one or more internal elements 114. For example, the remote device 104 may not be authorized to send a particular type of information to some or all of the internal elements 114. As a further example, the remote device 104 may be authorized to provide communication to an internal element 114 on the second network 111 but not authorized to provide communication to an internal element (e.g., system element) 114 on the first network 110. Accordingly, the security unit 118 can prevent unauthorized communication to the internal elements 114 on the first network 110.

Figure 2:
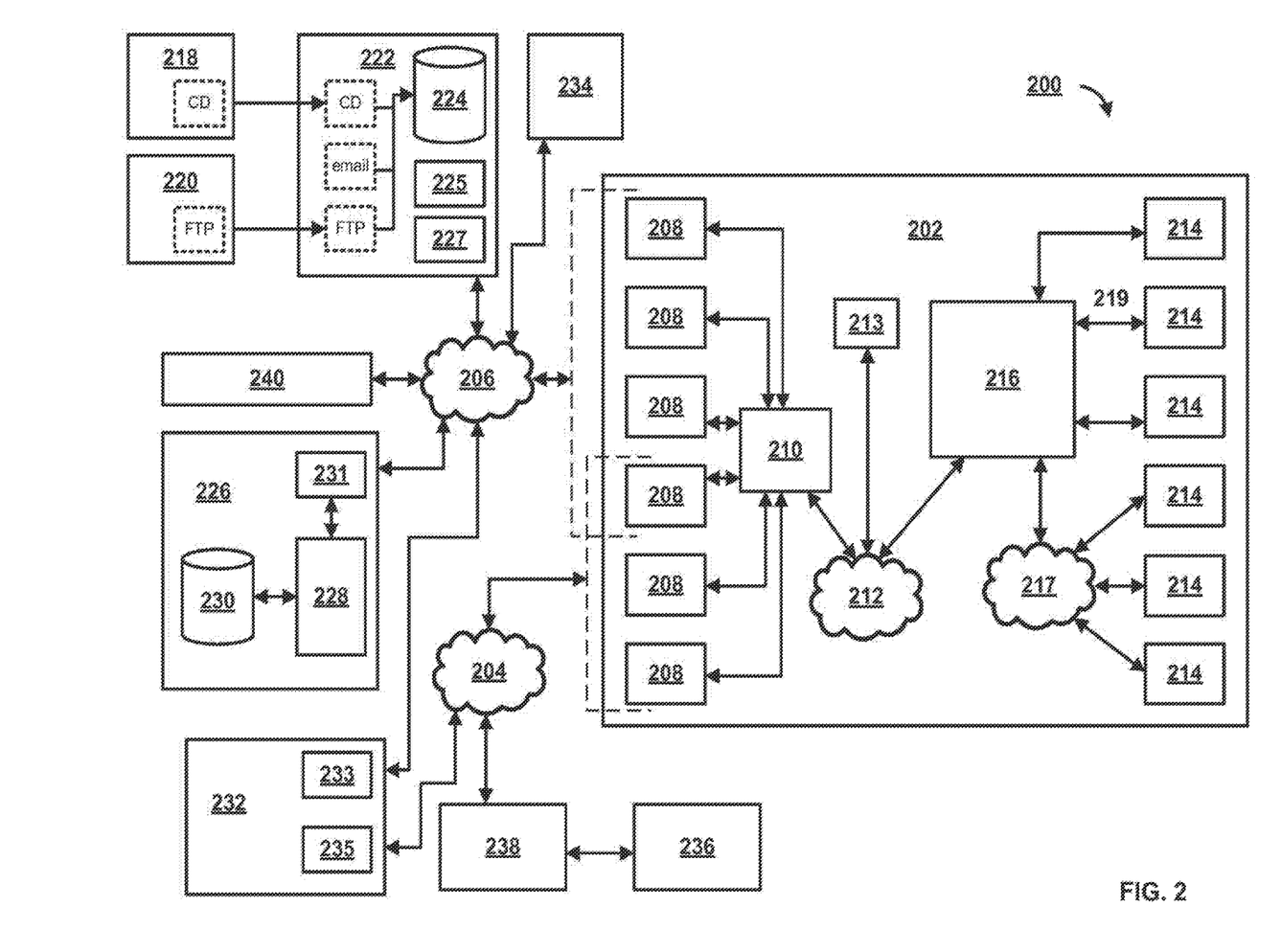
FIG. 2 is a block diagram illustrating an exemplary system for communicating information.

FIG. 2 is a block diagram illustrating an exemplary system 200 for communicating information. In one aspect, the system 200 can comprise a mobile network 202. The mobile network 202 can be contained within a vehicle that can be configured to transport (e.g., carry, convey, travel) people and/or items to and from a variety of locations. For example, the vehicle can comprise an airborne vehicle (e.g., airplane, helicopter, blimp), terrestrial vehicle (e.g., car, truck, motorcycle), space vehicle (e.g., satellite, space shuttle, rocket), and/or watercraft vehicle (e.g., boat, ship, submarine, hovercraft).

In one aspect, the system 200 can comprise a first network 204. The system 200 can also comprise a second network 206. The first network 204 and/or the second network 206 can comprise network adapters, switches, routers, and the like connected through wireless links (e.g., radio frequency, satellite) and/or physical links (e.g., fiber optic cable, coaxial cable, Ethernet cable). As an illustration, the first network 204 can communicate with a first communication protocol. In another aspect, the second network 206 can communicate with a second communication protocol. For example, the first network 204 can communicate using a protocol specific to the mobile network 202, such as Aircraft Communications Addressing and Reporting System (ACARS) based protocols or other similar protocols used in an airborne vehicle. The second communication protocol can comprise internet protocol or other similar protocol.

In one aspect, the mobile network 202 can comprise one or more communication units 208. For example, the communication units 208 can be configured to communicate according to a variety of communication standards, such as 802.x, 3G, 4G, satellite (e.g., Iridium satellite based network), HF, VHF, long term evolution (LTE), evolved high speed packet access (HPSA+), and the like. For example, communication units 208 that communicate according to satellite, HF, VHF, and the like can be communicatively coupled to the first network 204. Similarly, communication units 208 that are communicatively coupled to the second network 206 can use communicate standards, such as 802.x, 3G, 4G, satellite, future standards, and/or the like.

In one aspect, the mobile network 202 can comprise a switching unit 210 configured to switch between one or more of the communication units 208. For example, one or more of the communication units 208 can be configured to communicate through the first network 204, and one or more of the communication units 208 can be configured to communicate through the second network 206. As another example, some of the communication units 208 can be configured to communicate on both (e.g., at the same time, or in the alternative) the first network 204 and the second network 206. For example, communication units 208 that communicate according to satellite, HF, VHF, and the like can be communicatively coupled to the first network 204. Similarly, communication units 208 that are communicatively coupled to the second network 206 can use communicate standards, such as 802.x, 3G, 4G, satellite, future standards, and/or the like.

In one aspect, the switching unit 210 can select one or more of the communication units 208 to receive or transmit information. In one aspect, the switching unit 210 can select the communication units 208 according to selection rules. For example, the selection rules can be based on type of communication, cost of communication, location of the mobile network 202, time of communication, and the like. As an illustration, communication costs can be associated with the communication units 208. The communication costs can vary according to the location of the mobile network 202. The switching unit 210 can select the communication unit 208 such that communication is provided by the communication unit 208 associated with the lowest cost. In one aspect, different forms of data transmission have a cost associated with each form of data transmission based on a "network" model. As an example, the marginal costs for a user to access the user's own 802.1x WiFi network is typically very low. To transmit data via HF and/or VHF, a user operating a mobile network 102 of an aircraft will typically have a service contract with specialty providers such as SIDA and ARINC (e.g., location 238) to receive the data from the mobile network 202 and transmit this data to the appropriate location (e.g., locations 222, 226, 232, and 240). For cellular or satellite communications, users may be bound to one or more service contracts with a range of mobile, satellite, or other communication providers which re-transmit data to/from the mobile network 202 to the appropriate location (e.g., locations 222, 226, 232, and 240) via TCP/IP or other protocols. The cost for transmission can vary based on the size of the data being transmitted and/or the contract that is negotiated with the communication provider. For non-WiFi communications, HF and VHF can, in some scenarios, provide the lowest costs for small packets of information (e.g., kilobytes). For large packets of data (e.g., Megabytes to Gigabytes), Wi-Fi can, in some scenarios, be the least costly method of transmission, followed by cellular as the next least costly method of transmission. In some scenarios, satellite can be the most expensive transmission method but can be available globally.

In one aspect, the mobile network 202 can comprise a common communication network 212. The common communication network 212 can be configured to provide for communication according to a common communication protocol. For example, the common communication protocol can comprise an internet protocol or other similar communication protocol. The common communication network 212 can translate and/or transmit communications from a variety of internal elements 213 located in the mobile network 202. For example, the mobile network 202 can comprise a variety of internal elements, such as system elements 214, passenger (e.g., crew members, travelers) devices, and the like. Passenger devices can comprise televisions, portable computing devices (e.g., tablet device, laptops), mobile phones (e.g., smart phone), and the like.

In one aspect, the mobile network 202 can comprise a communication management unit 216. For example, the communication management unit 216 can be a server or other computing device. The communication management unit 216 can be configured to provide communication to and from a variety of system elements 214. The system elements 214 can comprise hardware devices and/or software modules. In one aspect, the system elements 214 can comprise devices used in the operation of the vehicle. The system elements 214 can be configured to communicate through a variety of protocols, such as internet protocol, Aircraft Communications Addressing and Reporting System (ACARS) based protocols, and other suitable protocols. The communication management unit 216 can be configured to translate a communication based on a first protocol to a communication based on a second protocol, such as the common communication protocol, and vice versa. As an illustration, the system elements 214 can comprise a line replaceable unit, a travel control system (e.g., flight management system), vehicle monitoring system (e.g., aircraft condition monitoring system), travel information management device (e.g., electronic flight bag), updating device (e.g., automatic data scheduler, hydra application), and the like.

In one aspect, the communication management unit 216 can be configured to provide information to and from the system elements 214 according to a variety networks, communication links, and/or networks. For example, one or more of the system elements 214 can be communicatively coupled to the communication management unit 216 through a system network 217. The system network 217 can comprise wireless and/or physical links. In one aspect, one or more of the system elements 214 can be communicatively coupled to the communication management unit 216. The communication management unit 216 can be communicatively coupled to one or more system elements 214 through communication links, such as system bus lines, serial lines, radio link, and/or the like. The system network 217 can be configured to use additional security, such as encryption, pairing, wire shielding, and/or like to prevent unauthorized communication on or disruption to the system network 217 and/or communication links 219.

In one aspect, the communication management unit 216 can be configured to provide updates to system elements 214. For example, the communication management unit 216 can comprise the update unit 116 of FIG. 1. The communication management unit 216 can be configured to prevent unauthorized communication with the system elements 214. As an illustration, the communication management unit 216 can comprise the security unit 118 of FIG. 1.

As an illustration, the mobile network 202 can receive a communication from one of the communication units 208. If the communication is for a passenger device, then the passenger device (e.g., internal element 213) can receive the communication based on the common communication protocol. If the communication is for a system element 214, the communication can be provided to the communication management unit 216 based on the common communication protocol. Then, the communication management unit 216 can translate the communication to the system element 214 based on a protocol associated with the system element 214.

In one aspect, the system 200 can be configured to communicate information between the mobile network 202 and one or more remote locations. For example, the mobile network 202 can be configured to receive updates, such as data updates, software updates, and/or the like. Data updates can comprise updated navigation data, such as flight routes, weather information, waypoints, scheduling information, emergency communications, and/or the like. Software updates can comprise updates to computer readable code used by a system element. The mobile network 202 can be configured to provide information to remote locations, such as flight data, weather data, geospatial data, elevation, speed, route information, emergency notifications, fuel levels, passenger information (e.g., data transmitted to and from passengers), and/or the like.

In one aspect, the system 200 can be configured to provide updates to the mobile network 202 from one or more remote locations. In one aspect, the system 200 can comprise a first update source 218. The first update source 218 can generate copies of updates onto a physical medium, such as a compact disk, floppy disk, flash drive, or hard disk. The first update source 218 can provide the updates by providing the updates to another location, such as the first location 222. The system 200 can also comprise a second update source 220. The second update source 220 can provide access to updates through a remote server (e.g., update device 224), such as a file transfer protocol server. The remote server can allow users to connect to the server from another location through a network or communication link. For example, the user can be a device (e.g., mobile network 202), a technician operating a portable management device 234 or other employee, a regulator, a service provider (e.g., an aircraft health-monitoring or engine health monitoring service), and/or the like. The user can connect to the appropriate/approved server locations via TCP/IP to check for updates, upload data, download data, and/or the like. The user can access the server anywhere that the user has an established data link. The list of appropriate/approved servers can be based on the applications loaded on the communication management unit 216, portable management device 234, or other approved devices. Personnel or vehicles with a need to access the various servers can be given permission by an administrator through user policies and procedures.

In one aspect, the system 200 can comprise a first location 222. The first location 222 can receive updates from the first update source 218, the second update source 220, and/or other sources. For example, the first location 222 can receive updates on a physical medium through the mail or other physical delivery method from the first update source 218. The first location 222 can access updates at the second update source 220 through a file transfer protocol server at the second update source 220. The first location 222 can receive updates from other sources through electronic messages, such as email, and the like.

In one aspect, the first location 222 can comprise an update device 224. For example, the update device 224 can comprise a server or other computing device. The update device 224 can be configured to store the updates. The update device 224 can be configured to provide the updates to the mobile network 202 through the second network 206. For example, the first location 222 can comprise a wireless communication unit 225, a satellite communication unit 227, or other communication device. The update device 224 can provide updates to the mobile network 202. The update device 224 can be configured to provide the updates according to a specified schedule. The update device 224 can be configured to store information to provide on-demand updates to one or more devices of the mobile network 202. For example, an update can be provided to a system element 214 in a maintenance scenario where a system element 214 or a part thereof is replaced. The update device 224 can be configured to buffer and/or store information to prevent updates from being transmitted to the mobile network 202 while one or more system elements 214 are performing operations critical to safe travel. The update device 224 can be configured to manage and provide the updates when the one or more system elements 214 that perform operations critical for safe travel are available to be updated (e.g., no longer performing an operation critical to safe travel). The update device 224 can be configured to store information pending availability of communications bandwidth based on bandwidth availability and/or cost. The update device 224 can be configured to host or otherwise implement one or more aspects of the security unit 118 of FIG. 1. The update device 224 can be configured to receive and aggregate information from one or more sources (e.g. weather and fuel information). In one aspect, the update device 224 can be configured to provide the aggregated information, such as a proposed update to a travel plan of the mobile network 202. For example, an updated travel plan can be provided to a system element 214 configured to manage travel.

In one aspect, the system 200 can comprise a second location 226. In one aspect, the second location 226 can comprise a server 228. The second location 226 can also comprise a database 230. The second location 226 can be communicatively coupled to the second network 206. For example, the second location 226 can comprise a wireless communication unit 231. For example, the server 228, database 230, and wireless communication unit 231 can be configured to separately and/or together perform the following functions: capture and analyze data, report equipment errors, collect data for reporting to manufacturers or regulators, perform predictive analytics, serve as a gateway between other information systems (e.g., internet service providers, financial service providers for customer transactions), monitor functions for shipping customers, and the like. In one aspect, devices at the second location 226 can be behind a security layer (e.g., hardware and/or software that controls access to information based on security rules) to protect data and information stored at the device. For example, the database 230 can be protected by behind a security layer.

In one aspect, the system 200 can comprise a third location 232. In one aspect, the third location 232 can comprise one or more owner operator internal networks. For example, the third location 232 can comprise a global operations control center (GOC). The global operations control center can be configured to monitor and control the movements of one or more mobile networks 202. For example, the GOC can collect geographic coordinates, speed, acceleration, direction of travel, altitude, and/or the like for one or more mobile networks 202. The third location 232 can also comprise maintenance operations control devices, engineering management devices, flight management devices, weight and balance management devices, ramp operations management devices, and the like. The third location 232 can be communicatively coupled to the first network 204 and the second network 206. For example, the third location 232 can comprise a wireless communication unit 233 configured to communicate through the second network 206. The wireless communication unit 233 can be configured to communicate according to IEEE 802 based standards. The third location 232 can also comprise a satellite communication unit 235 configured to communicate through the first network 204.

The system 200 can comprise a portable management device 234. For example, the portable management device 234 can be a tablet or other portable computing device operated by personnel (e.g., aircraft maintenance technician) associated with the mobile network 202. In one aspect, the portable management device 234 can be communicatively coupled to the mobile network 202 and other devices through the second network 206. The portable management device 234 can be used to receive system information from the mobile network 202, communicate updates to the mobile network 202, perform other maintenance functions to the mobile network 202, and the like.

In one aspect, the system 200 can also comprise additional locations. For example, the system 200 can comprise an air traffic control (ATC) location 236. The system 200 can also comprise an Aeronautical Radio Incorporated (ARINC) standard and/or a Société Internationale de Télécommunications Aéronautiques (SITA) standards based communication location 238. The system 200 can also comprise a transport provider network location 240. These locations 236, 238, 240 can comprise communication devices that allow the mobile network 202 to communicate with a variety of networks external to the mobile network 202. For example, the locations 236, 238, 240 can provide access to internet service providers, or specialized services such as Air Traffic Control, ARINC, and/or SITA. The external networks and/or the mobile network 202 can comprise a combined TCP/IP and/or non-TCP/IP network. As an illustration, the mobile network 202 can, while traveling, receive information through internet protocol from one of the locations 236, 238, 240. The mobile network 202 can transfer the information received through internet protocol to a system element 214, such as a transfer collision avoidance system (TCAS) via an ARINC standard based communication interface (e.g., ARINC standard 615 data interface). As another illustration, the mobile network 202 can receive internet protocol based data from a wireless device on board the mobile network 202 (e.g., an EFB). The mobile network 202 can transmit the data via a non-IP based communication link, such as an ACARS VHF datalink.

As a third example, a system element 214, such as a Digital Flight Data Acquisition Unit (DFDAU) can provide real-time data about other system elements to the communication management unit 216 via a communication link (e.g., or the system network 217 based on ARINC 717 or other protocol. The communication management unit 216 can convert this data, using protocols to a data format suitable for use by other applications. The communication management unit 216 can transmit the data across the common communication network 212 based on a TCP/IP stack for internet protocol transmission. The switching unit 210 can receive the data and determine that a particular communication method (e.g., WiFi) is the least costly routing of the data. The mobile network 202 can then transmit the data via a communication unit 208 (e.g., an IEEE 802.11 antenna) where the data is received by one or more locations and/or devices, such as the portable management device 234, the first location 222, and the second location 226, and/or the like for display of trouble shooting data.

Figure 3:
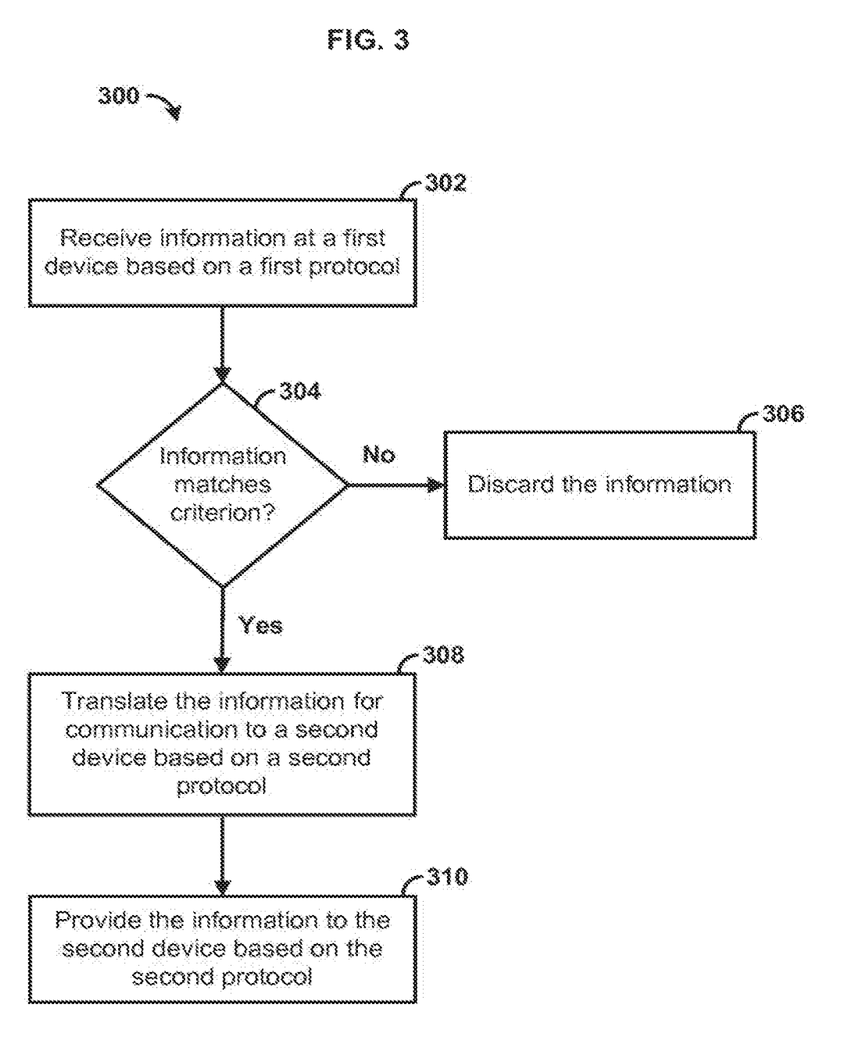
FIG. 3 is a flowchart illustrating an exemplary method for communicating information.

FIG. 3 is a flowchart illustrating an exemplary method 300 for communicating information. At step 302, information can be received at a first device based on a first protocol. The second protocol can comprise internet protocol, transmission control protocol (TCP), internet control message protocol (ICMP), user datagram protocol (UDP), Aircraft Communications and Reporting System (ACARS) protocol, an ARINC protocol, or other similar protocol. In one aspect, the information can comprise an update for a second device, (e.g., a system element of a transportation device), a request (e.g., for information, to perform a task), a message, a notification, and/or the like. The update can comprise an update to data stored at the second device and/or an update to software modules (e.g., computer readable code) of the second device.

At step 304, it can be determined whether the information matches a criterion associated with a transportation device. The criterion be a criterion of and/or associated with a security rule, update rule, and/or the like.

For example, determining whether the information matches the criterion associated with the transportation device can comprise evaluating an update rule associated with the transportation device. In one aspect, the update rule can specify at least one of a timing condition for applying the update to the second device, a location condition for applying the update to the second device, a cost condition for applying the update to the second device, and the like. A timing condition can comprise a condition specifying a time range when an update can and/or cannot be applied to one or more devices (e.g., the second device). A location condition can comprise a condition specifying a location (e.g., geographic area, elevation) and/or operation status (e.g., parked, traveling, in flight, maintenance, emergency procedure) of the transportation device. A cost condition can comprise a condition specifying a cost range, maximum cost, and/or the like for a variety of users and/or criticality of a transmission.

As another example, determining whether the information matches the criterion associated with the transportation device can comprise determining whether the information is authorized or unauthorized based on a security rule associated with the transportation device. A security rule can comprise a rule specifying types of users and/or devices that are authorized to supply an update to a device. A security rule can comprise a rule specifying a type of encryption, credentials, handshake process, and/or the like. The security rule can be associated with a location rule. For example, security rules can specify locations and/or operational status (e.g., currently traveling, maintenance mode) that certain security rules are applicable. A security rule can also comprise a rule requiring the information to be verified by a checksum process or other data integrity verification process.

If it is determined that the information matches the criterion, then the method can proceed to step 308. If it is determined that the information does not match the criterion, then the method 300 can proceed to step 306.

At step 306, the information can be discarded. In one aspect, an error message or other similar notification can be provided to the requesting device and/or other devices. In another aspect, a record can be stored (e.g., locally or remotely) indicating that the information was discarded and one or more reasons (e.g., error codes) indicating why the information was discarded.

At step 308, the information can be translated (e.g., at the first device) for communication to a second device based on a second protocol. The second protocol can comprise internet protocol, transmission control protocol (TCP), internet control message protocol (ICMP), user datagram protocol (UDP), Aircraft Communications and Reporting System (ACARS) protocol, an ARINC protocol, or other similar protocol. For example, the first protocol can comprise one of an internet protocol and an Aircraft Communications Addressing and Reporting System (ACARS) protocol and the second protocol can comprise the other of the internet protocol and the ACARS protocol. As another example, the first protocol can comprise at least one of an internet protocol, an Aeronautical Radio, Incorporated (ARINC)

protocol, and an Aircraft Communications Addressing and Reporting System (ACARS) protocol and the second protocol can comprise at least one of a remaining protocol of the internet protocol, ARINC protocol, and the ACARS protocol. Translation can comprise removing formatting (e.g., packaging) of the first protocol from the information and applying formatting of the second protocol to the information.

At step 310, the information can be provided to the second device based on the second protocol and a determination that the information matches the criterion. providing the information to the second device based on the second protocol can comprise applying the update to the second device based on the information matching a criterion, such one specified by an update rule, security rule (e.g., if the information is authorized under the security rule), and/or other rule.

In one aspect, the first device and the second device can be components of the transportation device. The transportation device can comprise an aircraft, a boat, a ground vehicle, and/or the like. The transportation device can be manned or unmanned. In one aspect, the first device can comprise a computing device, such as a server, gateway, and/or the like. The first device can comprise the communication management unit 215 of FIG. 2 and/or CTMU 106 of FIG. 1. In one aspect, the second device can comprise an internal element (e.g., internal element 114 of FIG. 1 and/or internal element 213 of FIG. 2) and/or a system element (e.g., system element 214 of FIG. 2) of the transportation device, such as a flight management system, an aircraft condition monitoring system, an electronic flight bag, a line replaceable unit, and/or the like.

Figure 4:
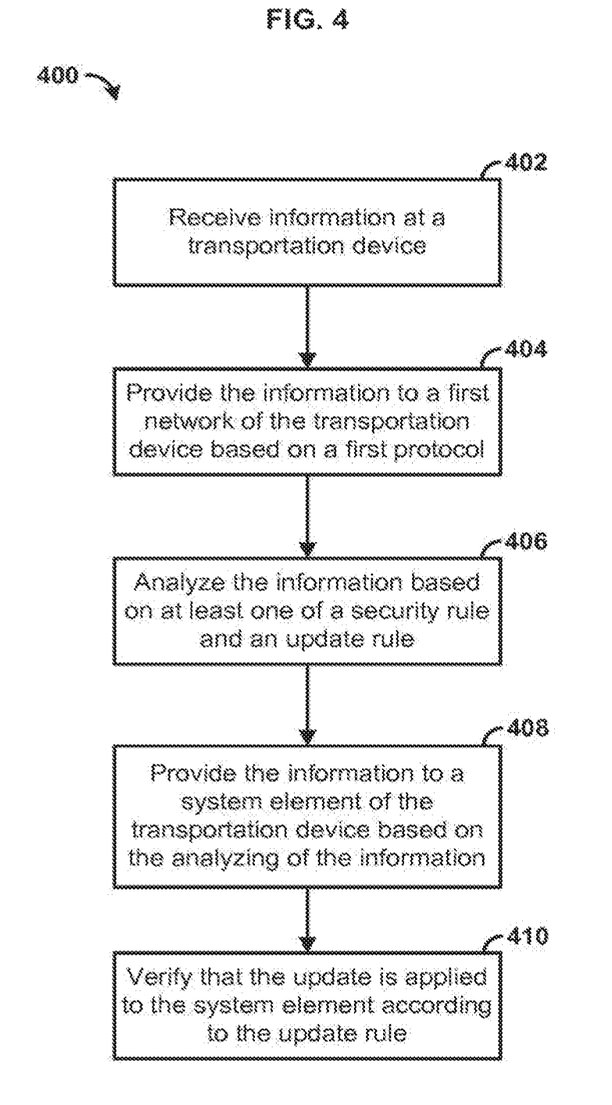
FIG. 4 is a flowchart illustrating another exemplary method for communicating information.

FIG. 4 is a flowchart illustrating another exemplary method 400 for communicating information. At step 402, information can be received at a transportation device. The transportation device can comprise an aircraft, a boat, a ground vehicle, and/or the like. The information can comprise an update to the system element, a request (e.g., for information, to perform a task), a message, a notification, and/or the like. The update can comprise an update to data stored at the system element and/or an update to software modules (e.g., computer readable code) of the system element.

At step 404, the information can be provided to a first network of the transportation device based on a first protocol. For example, the first network can comprise the first network 110 of FIG. 1 and/or the common communication network 212 of FIG. 2. The first protocol can comprise internet protocol, transmission control protocol (TCP), internet control message protocol (ICMP), user datagram protocol (UDP), Aircraft Communications and Reporting System (ACARS) protocol, an ARINC protocol, or other similar protocol.

At step 406, the information can be analyzed (e.g., at a component of the first network) based on at least one of a security rule and an update rule. Analyzing the information can comprise determining whether the information is authorized or unauthorized for the system element. In one aspect, the component of the first network can comprise a computing device, such as a router, switch, server, gateway, and/or the like. The component of the first network can comprise the communication management unit 215 of FIG. 2 and/or the CTMU 106 of FIG. 1.

As an example, the update rule can specify at least one of a timing condition for applying an update to the system element, a location condition for applying the update to the system element, a cost condition for applying the update to the system element, and the like. A timing condition can comprise a condition specifying a time range when an update can and/or cannot be applied to one or more devices (e.g., the second device). A location condition can comprise a condition specifying a location (e.g., geographic area, elevation) and/or operation status (e.g., parked, traveling, in flight, maintenance, emergency procedure) of the transportation device. A cost condition can comprise a condition specifying a cost range, maximum cost, and/or the like for a variety of users and/or criticality of a transmission.

At step 408, the information can be provided to a system element (e.g., internal element 214 of FIG. 1, internal element 213 and/or system element 214 of FIG. 2) of the transportation device based on the analyzing of the information. In one aspect, the system element can comprise at least one of a flight management system, an aircraft condition monitoring system, and an electronic flight bag. In one aspect, the information can be provided to the system element if the information is authorized. In one aspect, the information can be translated (e.g., at the component) for communication to a system element (e.g., based on a second protocol). Translation can comprise removing formatting (e.g., packaging) of the first protocol from the information and applying formatting of the second protocol or other standard to the information.

Alternatively, the information can be discarded. In one aspect, an error message or other similar notification can be provided to the requesting device and/or other devices. In another aspect, a record can be stored (e.g., locally or remotely) indicating that the information was discarded and one or more reasons (e.g., error codes) indicating why the information was discarded.

In one aspect, the information can be provided to the system element through a second network of the transportation device based on a second protocol. The second protocol can comprise internet protocol, transmission control protocol (TCP), internet control message protocol (ICMP), user datagram protocol (UDP), Aircraft Communications and Reporting System (ACARS) protocol, an ARINC protocol, or other similar protocol. For example, the first protocol can comprise one of an internet protocol and an Aircraft Communications Addressing and Reporting System (ACARS) protocol and the second protocol comprises the other of the internet protocol and the ACARS protocol. As another example, the first protocol can comprise at least one of an internet protocol, an Aeronautical Radio Incorporated (ARINC) protocol, and an Aircraft Communications Addressing and Reporting System (ACARS) protocol and the second protocol can comprise at least one of a remaining protocol of the internet protocol, ARINC protocol, and the ACARS protocol.

At step 410, it can be verified (e.g., if the information is analyzed based on the update rule) that the update is applied to the system element according to the update rule. For example, the one or more tests can be run on the system element to determine data integrity, system functionality, and/or the like.

Figure 5:
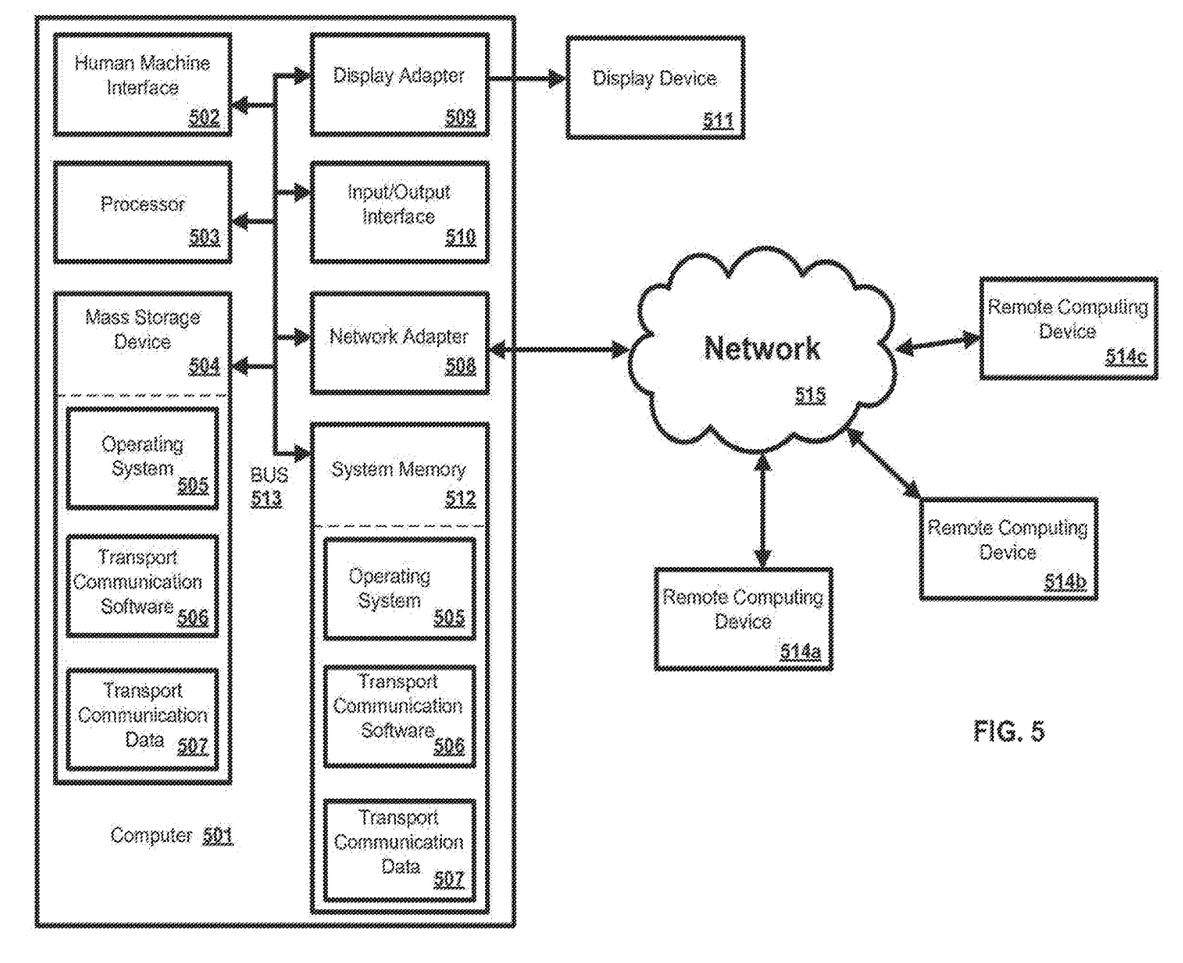
FIG. 5 is a block diagram illustrating an exemplary computing device in which the present methods and systems can operate.

In an exemplary aspect, the methods and systems can be implemented on a computer 501 as illustrated in FIG. 5 and described below. By way of example, communications traffic management unit 106 of FIG. 1 can be a computer as illustrated in FIG. 5. Similarly, the methods and systems disclosed can utilize one or more computers to perform one or more functions in one or more locations. FIG. 5 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 501. The components of the computer 501 can comprise, but are not limited to, one or more processors 503, a system memory 512, and a system bus 513 that couples various system components including the one or more processors 503 to the system memory 512. In one aspect, the system can utilize parallel computing.

The system bus 513 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The system bus 513, and all buses specified in this description can also be implemented over a wired or wireless network connection and each of the subsystems, including the one or more processors 503, a mass storage device 504, an operating system 505, transport communications software 506, transport communications data 507, a network adapter 508, system memory 512, an Input/Output Interface 510, a display adapter 509, a display device 511, and a human machine interface 502, can be contained within one or more remote computing devices 514a,b,c at physically separate locations, connected through buses of this form, in effect implementing a fully distributed system.

The computer 501 typically comprises a variety of computer readable media. Exemplary readable media can be any available media that is accessible by the computer 501 and comprises, for example and not meant to be limiting, both volatile and non-volatile media, removable and non-removable media. The system memory 512 comprises computer readable media in the form of volatile memory, such as random access memory (RAM), and/or non-volatile memory, such as read only memory (ROM). The system memory 512 typically contains data such as transport communications data 507 and/or program modules such as operating system 505 and transport communications software 506 that are immediately accessible to and/or are presently operated on by the one or more processors 503.

In another aspect, the computer 501 can also comprise other removable/non-removable, volatile/non-volatile computer storage media. By way of example, FIG. 5 illustrates a mass storage device 504 which can provide non-volatile storage of computer code, computer readable instructions, data structures, program modules, and other data for the computer 501. For example and not meant to be limiting, a mass storage device 504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 504, including by way of example, an operating system 505 and transport communications software 506. Each of the operating system 505 and transport communications software 506 (or some combination thereof) can comprise elements of the programming and the transport communications software 506. Transport communications data 507 can also be stored on the mass storage device 504. Transport communications data 507 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 501 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 503 via a human machine interface 502 that is coupled to the system bus 513, but can be connected by other interface and bus structures, such as a parallel port, game port, an IEEE 1394 Port (also known as a Firewire port), a serial port, or a universal serial bus (USB).

In yet another aspect, a display device 511 can also be connected to the system bus 513 via an interface, such as a display adapter 509. It is contemplated that the computer 501 can have more than one display adapter 509 and the computer 501 can have more than one display device 511. For example, a display device can be a monitor, an LCD (Liquid Crystal Display), or a projector. In addition to the display device 511, other output peripheral devices can comprise components such as speakers (not shown) and a printer (not shown) which can be connected to the computer 501 via Input/Output Interface 510. Any step and/or result of the methods can be output in any form to an output device. Such output can be any form of visual representation, including, but not limited to, textual, graphical, animation, audio, tactile, and the like. The display device 511 and computer 501 can be part of one device, or separate devices.

The computer 501 can operate in a networked environment using logical connections to one or more remote computing devices 514a,b,c. By way of example, a remote computing device can be a personal computer, portable computer, smartphone, a server, a router, a network computer, a peer device or other common network node, and so on. Logical connections between the computer 501 and a remote computing device 514a,b,c can be made via a network 515, such as a local area network (LAN) and/or a general wide area network (WAN). Such network connections can be through a network adapter 508. A network adapter 508 can be implemented in both wired and wireless environments. Such networking environments are conventional and commonplace in dwellings, offices, enterprise-wide computer networks, intranets, and the Internet.

For purposes of illustration, application programs and other executable program components such as the operating system 505 are illustrated herein as discrete blocks, although it is recognized that such programs and components reside at various times in different storage components of the computer 501, and are executed by the data processor(s) of the computer. An implementation of transport communications software 506 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Throughout this application, various publications are referenced. The disclosures of these publications in their entireties are hereby incorporated by reference into this application in order to more fully describe the state of the art to which the methods and systems pertain.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   receiving information at a first device based on a first protocol;
   translating the information, at the first device, for communication to a second device of an aircraft using a second protocol;
   determining, based on a relevancy of the second device to operate the aircraft, a criterion associated with the aircraft, wherein the criterion comprises one or more of a security rule associated with the aircraft or an update rule associated with the aircraft;
   determining that the information satisfies the criterion associated with the aircraft; and
   responsive to a determination that the information satisfies the criterion, providing the information to the second device using the second protocol.

2. The method of claim 1, wherein the first device and the second device are components of the aircraft.

3. The method of claim 1, wherein the second device comprises at least one of a flight management system, an aircraft condition monitoring system, or an electronic flight bag of the aircraft.

4. The method of claim 1, wherein the information comprises an update for the second device, wherein determining that the information satisfies the criterion associated with the aircraft comprises evaluating the update rule associated with the aircraft, and wherein providing the information to the second device using the second protocol comprises applying the update to the second device based on the update rule associated with the aircraft.

5. The method of claim 4, wherein the update rule associated with the aircraft specifies at least one of a timing condition for applying the update to the second device, a location condition for applying the update to the second device, or a cost condition for applying the update to the second device.

6. The method of claim 1, wherein determining that the information satisfies the criterion associated with the aircraft comprises determining whether the information is authorized or unauthorized based on the security rule, and wherein providing, based on the security rule, the information to the second device using the second protocol comprises sending the information to the second device according to the second protocol if the information is authorized.

7. The method of claim 1, wherein the first protocol comprises at least one of an internet protocol, an Aeronautical Radio Incorporated (ARINC) protocol, or an Aircraft Communications Addressing and Reporting System (ACARS) protocol and the second protocol comprises at least one of a remaining protocol of the internet protocol, ARINC protocol, or the ACARS protocol.

8. A method comprising:
receiving information at an aircraft;
providing the information to a first network of the aircraft based on a first protocol;
determining, based on a relevancy of an aircraft system element to operate the aircraft, at least one of a security rule associated with the aircraft or an update rule associated with the aircraft, wherein the information is intended for the aircraft system element;
analyzing the information, at a component of the first network of the aircraft, based on the at least one of the security rule or the update rule; and
providing the information to the aircraft system element of the aircraft based on the analyzing of the information.

9. The method of claim 8, wherein analyzing the information based on the at least one of the security rule or the update rule comprises determining whether the information is authorized or unauthorized for the aircraft system element, wherein the information is provided to the aircraft system element if the information is authorized.

10. The method of claim 8, wherein the information is provided to the aircraft system element through a second network of the aircraft based on a second protocol.

11. The method of claim 10, wherein the first protocol comprises at least one of an internet protocol, an Aeronautical Radio, Incorporated (ARINC) protocol, or an Aircraft Communications Addressing and Reporting System (ACARS) protocol and the second protocol comprises at least one of a remaining protocol of the internet protocol, ARINC protocol, or the ACARS protocol.

12. The method of claim 8, wherein the aircraft system element comprises at least one of a flight management system, an aircraft condition monitoring system, or an electronic flight bag.

13. The method of claim 8, wherein the update rule specifies at least one of a timing condition for applying an update to the aircraft system element, a location condition for applying the update to the aircraft system element, or a cost condition for applying the update to the aircraft system element.

14. The method of claim 8, wherein the information comprises an update to the aircraft system element, the method further comprising verifying that the update is applied to the aircraft system element according to the update rule.

15. An aircraft, comprising:
an aircraft system element configured to assist in navigation of the aircraft;
a first network configured to communicate based on a first protocol;
a second network configured to communicate based on a second protocol, wherein the second network is communicatively coupled to the aircraft system element; and
a communication management device communicatively coupled to the first network and the second network, wherein the communication management device is configured to: determine, based on a relevancy of the aircraft system element to operate the aircraft, at least one of a security rule associated with the aircraft or an update rule associated with the aircraft; and translate information between the first network and the second network based on the at least one of the security rule or the update rule.

16. The aircraft of claim 15, further comprising a selection device configured to select one or more transceivers and provide the information from the selected one or more transceivers to the first network.

17. The aircraft of claim 15, wherein the aircraft system element comprises at least one of a flight management system, an aircraft condition monitoring system, or an electronic flight bag.

18. The aircraft of claim 15, wherein the update rule specifies at least one of a timing condition for applying an update to the aircraft system element, a location condition for applying the update to the aircraft system element, or a cost condition for applying the update to the aircraft system element.

19. The aircraft of claim 15, wherein the communication management device is configured to: determine, based on the security rule, whether the information received from the first network is authorized or unauthorized for the aircraft system element and discard the information if the information is unauthorized for the aircraft system element.

20. The aircraft of claim 15, wherein the communication management device is further configured to verify, based on the update rule, that an update is applied to the aircraft system element.

* * * * *